(12) United States Patent
Yamaguchi et al.

(10) Patent No.: US 6,419,272 B1
(45) Date of Patent: Jul. 16, 2002

(54) PRETENSIONER FOR SEAT BELTS

(75) Inventors: Hiroyoshi Yamaguchi; Eiji Shimizu, both of Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/582,682

(22) PCT Filed: Nov. 4, 1998

(86) PCT No.: PCT/JP98/04970

§ 371 (c)(1),
(2), (4) Date: Aug. 25, 2000

(87) PCT Pub. No.: WO00/26068

PCT Pub. Date: Nov. 5, 2000

(51) Int. Cl.$^7$ ............................................. B60R 22/195
(52) U.S. Cl. ...................................... 280/806; 297/480
(58) Field of Search ......................... 280/806; 297/480; 242/374

(56) References Cited

U.S. PATENT DOCUMENTS

| | | | | |
|---|---|---|---|---|
| 3,888,085 A | * | 6/1975 | Larsonneur | 280/806 |
| 3,901,531 A | * | 8/1975 | Prochazka | 297/480 |
| 4,232,886 A | * | 11/1980 | Tsuge et al. | 280/806 |
| 5,039,127 A | * | 8/1991 | Fohl | 280/806 |
| 5,313,690 A | * | 5/1994 | Hiramatsu et al. | 280/806 |
| 5,505,399 A | * | 4/1996 | Schmid et al. | 242/374 |
| 5,651,564 A | * | 7/1997 | Isaji et al. | 280/806 |
| 5,794,978 A | | 8/1998 | Nishide | |
| 5,899,399 A | * | 5/1999 | Brown et al. | 242/374 |
| 5,984,357 A | * | 11/1999 | Yasuda et al. | 280/806 |

FOREIGN PATENT DOCUMENTS

| | | | |
|---|---|---|---|
| GB | 2 323 769 | * | 10/1998 |
| JP | 50-78027 | | 6/1975 |
| JP | 1-152860 | | 10/1989 |
| JP | 8-198055 | | 8/1996 |

* cited by examiner

*Primary Examiner*—Peter English
(74) *Attorney, Agent, or Firm*—Marshall & Melhorn, LLC (57) ABSTRACT

Disclosed is a seat belt pretensioner device for moving a moveably supported seat belt buckle in a direction to increase the tension of a seat belt with a power generating device so as to automatically increase the tension of the seat belt in case of an impact situation. such as a vehicle crash. The power generator comprises a bladder-like member that can be pressurized for expansion, and a chamber defined for guiding the direction of the expansion of the bladder-like member. The buckle of the seat belt can be moved in the direction to increase the tension of the seat belt by pushing a member supporting the buckle with the bladder-like member.

9 Claims, 8 Drawing Sheets

Fig. 10

PRETENSIONER FOR SEAT BELTS

TECHNICAL FIELD

The present invention relates to a pretensioner device for automatically increasing the tension of an automotive seat belt.

BACKGROUND OF THE INVENTION

An automotive seat is typically provided with a seat belt to restrain the vehicle occupant and prevent the occupant from being thrown forward at the time of a vehicle crash. A seat bolt is often incorporated with an emergency locking retractor (ELR) device for locking a winding shaft of the seat belt only at the time of a sudden stop and/or a vehicle crash while permitting free movement of the vehicle occupant under normal conditions. An ELR device locks up the winding shaft in an extremely short time upon detection of deceleration exceeding a prescribed level, and thereby prevents the seat belt from being paid out any further.

When the winding shaft is simply locked up, it is unavoidable to have a certain length of the seat belt resulting from the tightening of the length of the seat belt wound on the winding shaft to be paid out. In view of this problem, pretensioner devices of different kinds have been proposed, and one of such pretensioner devices is designed to pull the buckle attached to the seat belt in the direction to increase the tension of the seat belt so as to improve the restraining capability of the seat belt.

A typical buckle pretensioner device includes a base plate for attaching the device main body to one side of a seat, an arm having one end pivotally attached to the base plate and another end connected to a base end of a buckle, a power generator attached to the base plate to pull the buckle via a link mechanism and the arm, and a reverse preventing device for preventing the buckle from reversing its motion once it is pulled by the power generator.

Because the power generator typically uses the power generated by igniting a propellant received in a cylinder and pushing out a piston member with the resulting combustion gas, it is necessary that the linear motion of the piston is converted into a rotary motion of the arm, and this rotary motion is in turn converted into the linear motion of the buckle. Therefore, the efficiency of power transmission is dictated by the length of the arm, and the size and configuration of the link mechanism. For this reason, it becomes necessary to use a relatively large power generator, a long arm and a complex link mechanism, and these factors contributed to the increase in the size of the device. In the case of a front seat, the buckle is typically provided in a gap defined between a seat slide rail and a center console, and this gap is normally so small that the excessive size of the pretensioner device may require a redesigning of the seat and the entire layout of the passenger compartment.

The present invention was made in view of eliminating such problems of the prior art, and its primary object is to provide a seat belt pretensioner device which is compact, requires a small number of component parts and increase the reliability of operation, and is easy to assemble.

BRIEF SUMMARY OF THE INVENTION

According to the present invention, such an object can be accomplished by providing a seat belt pretensioner device for moving a moveably supported seat belt buckle in a direction to increase the tension of a seat belt with a power generating device, and preventing the reversing of the movement of the buckle with a reverse preventing device, so as to automatically increase the tension of the seat belt in case of an impact situation such as a vehicle crash, characterized by that: the power generator is adapted to produce a pressure by means of a combustion of a propellant; a bladder-like member being expanded under the pressure produced from the power generator inside a chamber defined for guiding a direction of expansion of the bladder-like member to push a member supporting the buckle or, without using a bladder-like member, the member supporting the buckle being moved directly under pressure produced from the combustion of a propellant, to move the buckle in the direction to increase the tension of the seat belt. The reverse preventing device may comprise a plurality of ratchet teeth, and a plurality of pawl members which are adapted to engage the ratchet teeth at different timing.

Because the combustion gas pressure obtained from the power generating device can be directly applied to a buckle supporting member to actuate the buckle once the airtightness of the parts for transmitting the pressure is ensured, a link mechanism is not required, and the number of component parts can be minimized. This contributes to the compact and light-weight design of the overall device. The movement of the buckle is achieved only through a change in the inner pressure of the chamber of the bladder-like member from the start to the end of its motion, and there is no cause for attenuation of power transmission due to the changing of the direction of a force by a link mechanism or other mechanical structures so that the size of the power generator can be minimized. In particular, according to an arrangement where a buckle support member supporting the buckle at a peripheral end thereof is rotatably supported by a seat, it is preferable to define a curved chamber along the rotational direction of the buckle support member for transmission of pressure.

Because the exposed parts consist of the buckle and a portion of the buckle support member, the interference with other components or vehicle occupants at the time of operation is minimized, and the layout and design of the device are both simplified.

DETAILED DESCRIPTION OF THE PREFERRED EMBODIMENTS

Now the preferred embodiments of the present invention are described in the following with reference to the appended drawings.

Figure 1:
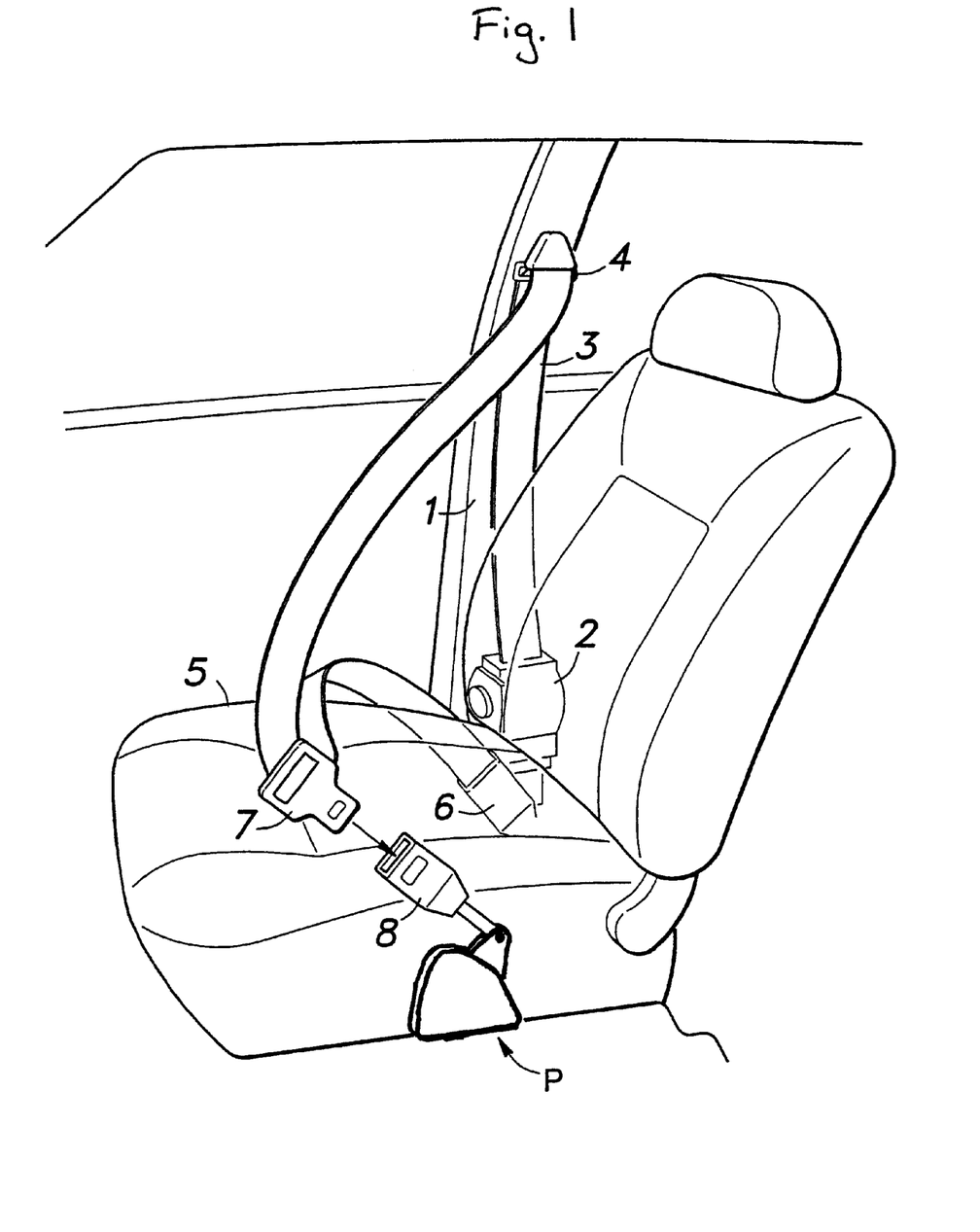
FIG. 1 is a perspective view of a seat to which the present invention is applied.

FIG. 1 generally shows a vehicle seat to which the present invention is applied. Referring to FIG. 1, a seat belt 3 which extends upward from an ELR device 2 fixedly attached to a lower part of a center pillar 1 of a passenger compartment is passed through a through ring 4 attached to an upper part of the center pillar 1 and then extends downward. An extreme end 6 of the seat belt is attached to a rear part of one side of a seat 5. The part of the seat belt 3 extending between the through ring 4 and the extreme end 6 is provided with a tongue plate 7 so as to be moveable along the length of the seat belt 3. The side of the seat remote from the point of attachment of the seat belt end 6 is provided with a buckle 8 via a pretensioner device P embodying the present invention.

As the vehicle occupant seated in the seat 5 pulls out the seat belt 3 from the ELR device 2 and engages the tongue plate 7 with the buckle 8, the seat bolt 3 is passed along the shoulder, chest and waist of the vehicle occupant.

Figure 2:
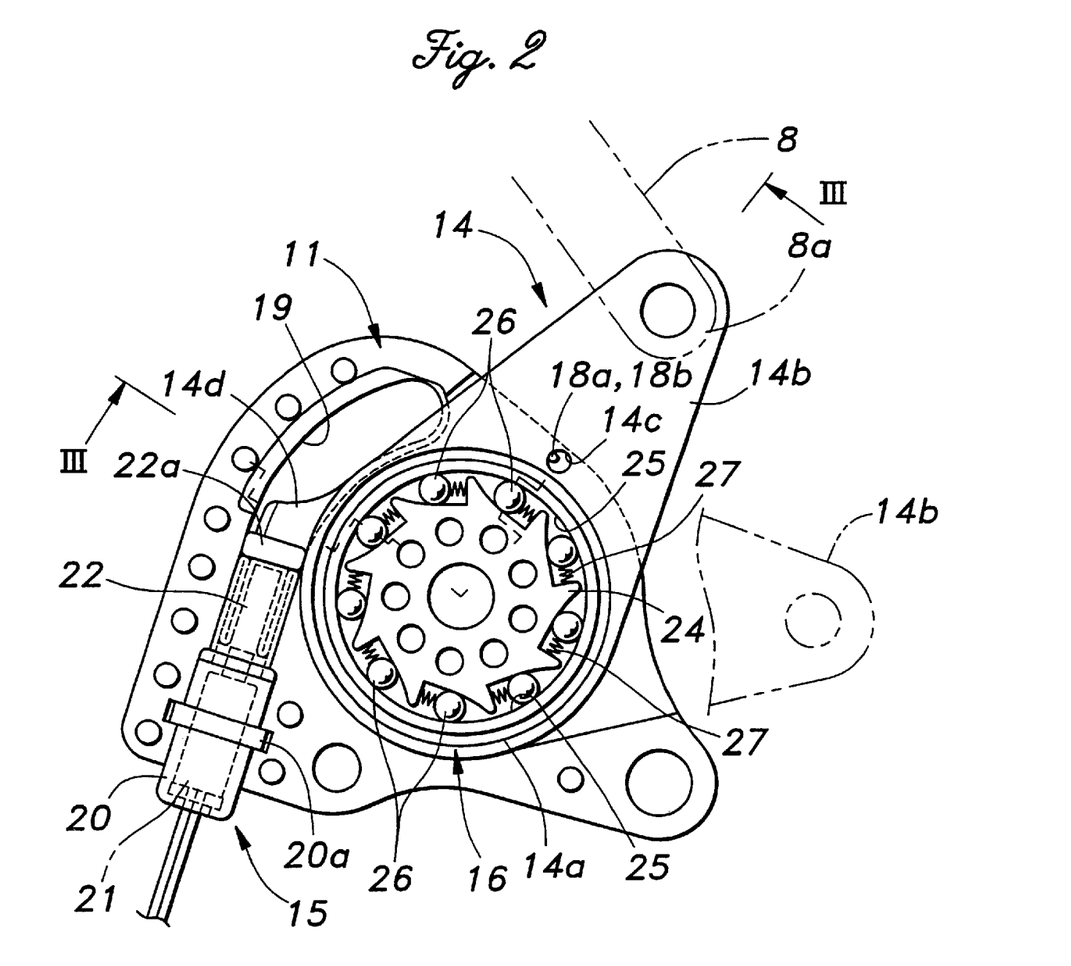
FIG. 2 is a side view of a seat belt pretensioner device embodying the present invention, with one of the plates being omitted.
Figure 3A:
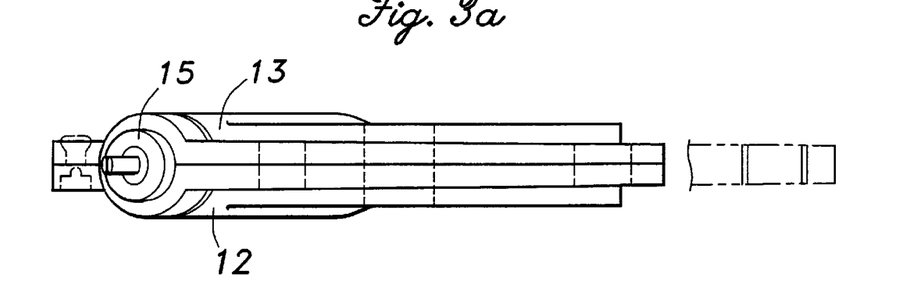
FIG. 3a is a bottom view of the seat belt pretensioner device according to the present invention.
Figure 3B:
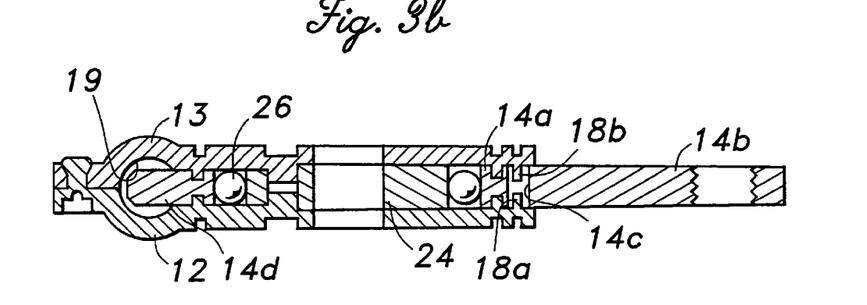
FIG. 3b is a sectional view taken along line III—III of FIG. 2.
Figure 4:
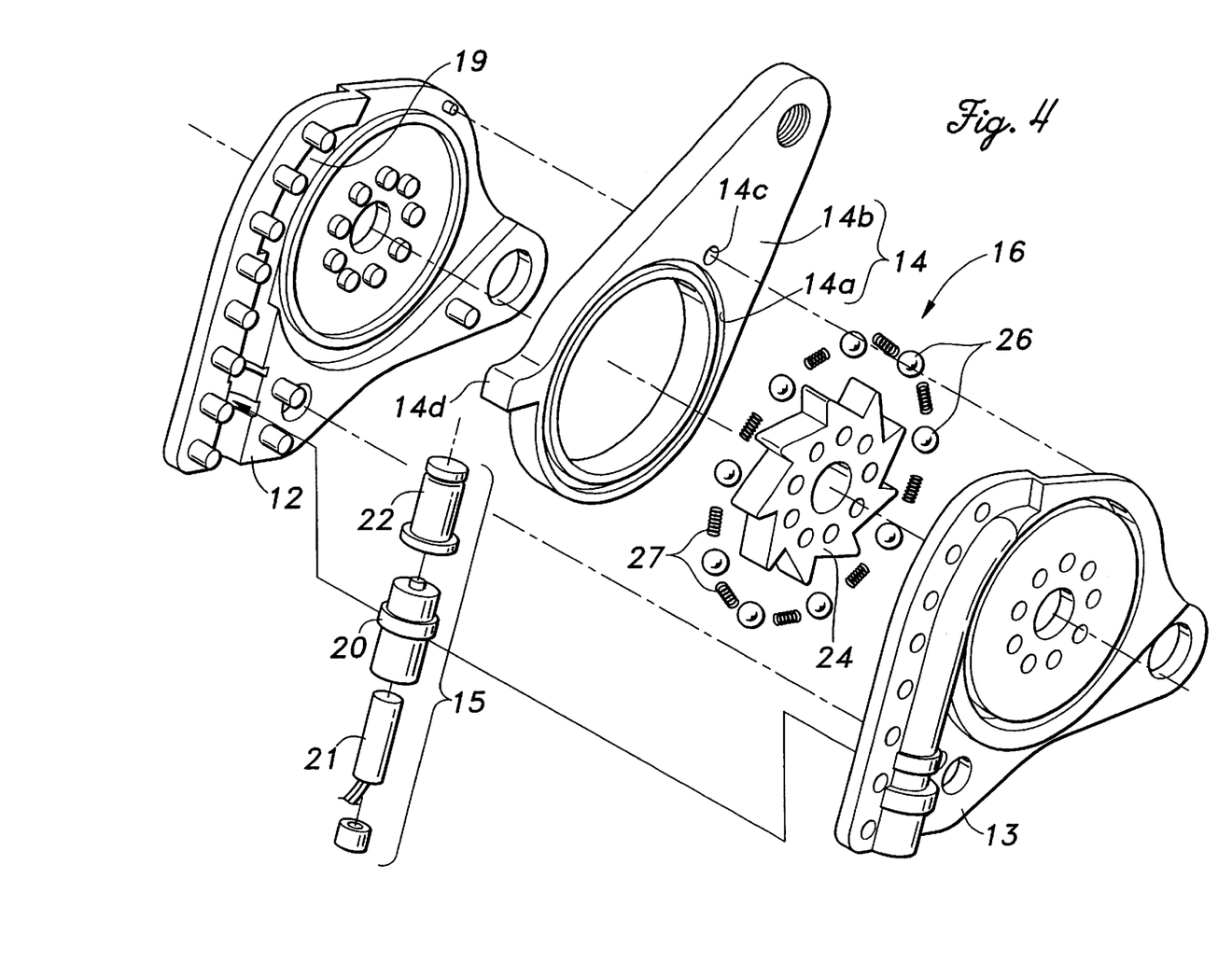
FIG. 4 is an exploded perspective view of the seat belt pretensioner device according to the present invention.

The pretensioner device P is designed to automatically increase the tension of the seat belt at the time of a vehicle crash or the like, and as shown in FIGS. 2 to 4, comprises a base unit 11 combining a pair of plates 12 and 13 one over the other to fixedly attached the device to a side of the seat 5, an arm 14 having an annular end 14a received in the base unit 11 and another end connected to an anchor portion 8a of the buckle 8, a thrust generating device 15 which is substantially fixedly attached to the base unit 11, and a reverse preventing device 16 for limiting the rotation of the arm 14 only to one direction.

The two plates 12 and 13 are integrally attached to each other by placing one of the plates 13 over the other 12, and crimping bosses projecting from the one plate onto the other plate, after the remaining components are assembled. The component parts can be assembled from only one direction as illustrated in FIG. 4, and this simplifies the assembly work, and makes it suitable for automatic assembly. Because the arm 14 is positioned in a middle with respect to the thickness of the device, and is flanked from both sides, the arm 14 is supported by both of the plates 12 and 13, and demonstrates a high mechanical strength against a bending load.

The base unit 11 receives the annular end 14a of the arm 14, and the other end 14b of the arm 14 projects from the base unit 11. An open end of the base unit 11 which is adapted to abut the other end 14b serves as a stopper for defining the limit of angular motion of the arm 14. This arrangement allows the number of component parts to be reduced.

A middle portion of the arm 14 is provided with an opening 14c for receiving pins 18a and 18b projecting form the plates 12 and 13 of the base unit 11, respectively, so as to form a catch for preventing the inadvertent rotation of the arm 14.

Figure 5A:
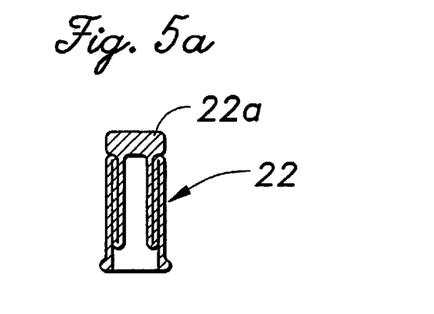
FIG. 5a is a sectional view of the balloon packing in its retracted state.
Figure 5B:
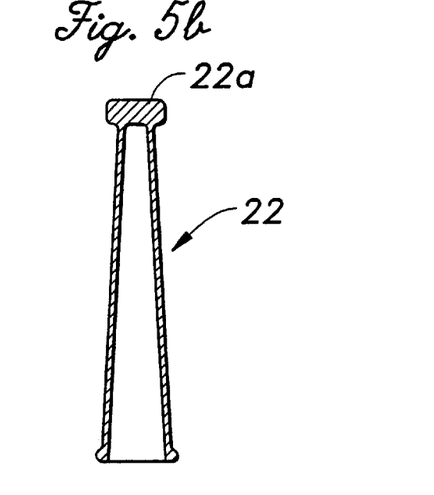
FIG. 5b is a sectional view of the balloon packing in its deployed state.

The base unit 11 defines an elongated chamber 19 having the shape of letter-J so as to partially surround the annular end 14a of the arm 14. The thrust generating device 15 is attached to a base end of this chamber 19. The thrust generating device 15 is adapted to produce a thrust through rapid combustion of a propellant 21 received in the base end of a cylinder 20 according to a signal from a deceleration sensor which is not shown in the drawing. A free end of the cylinder 20 is fitted with a balloon packing 22 consisting of a bladder-like member which is normally compactly folded, but can inflate into a slightly curved rod inside the chamber 19 by virtue of the thrust produced from the thrust generating device 15 (FIG. 5a and 5b). The free end of the balloon packing 22 is provided with a contact portion 22a having a relatively high rigidity for engaging a projection 14d provided in the annular portion 14a of the arm 14 so that the contact portion 22a may push the projection 14d and turn the arm 14 in clockwise direction in FIG. 2 upon expansion of the balloon packing 22 owing to the combustion thrust of the propellant 21. The part of the balloon packing 22 attached to the cylinder 20 is provided with an increased thickness in the manner of an O-ring so that the inadvertent detachment of the balloon packing 22 can be avoided and a favorable sealing can be achieved. The cylinder 20 of the thrust generating device 15 is attached to the base unit 11 via a flange 20a formed in a middle part of the cylinder 20. As this flange 20a prevents the movement of the cylinder in both the fore and aft directions. it is possible to place the propellant 21 in the cylinder 20 and close it by crimping to complete the assembling of the pretensioner device after all the remaining component parts including the cylinder 20 are fully assembled to the base unit 11. Therefore, the safety management of the manufacturing process can be simplified.

Figure 5C:
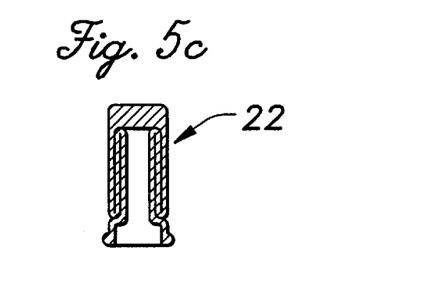
FIG. 5c and 5d are views similar to FIG. 5a showing different embodiments of the seat belt pretensioner device.
Figure 5D:
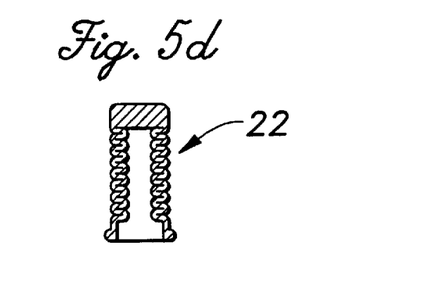

In practice, it is preferable to reinforce the balloon packing 22 by applying a fabric lining or the like to the inner and/or outer surfaces thereof so that the rupturing of the balloon packing 22 under high pressure may be avoided. It is also possible to insert mold a planar or cup-shaped metallic member in the contact portion at the free end of the balloon packing 22. In the illustrated embodiment, the balloon packing 22 was folded with the base end out, but it is also possible to fold it with the free end contact portion 22a out as shown in FIG. 5c or fold it in the manner of a bellows as shown in FIG. 5d. It is conceivable that enlarging the free end contact portion 22a as shown in FIG. 5c may be beneficial in improving the efficiency of pressure transmission in an early phase of expansion.

The reverse preventing device 16 consists of a ball-type one-way clutch comprising the annular portion 14a of the arm 14 serving as an outer race, a fixed inner race 24 which is located inside the annular portion 14a and integral with the base unit 11, a plurality of balls 26 received in corresponding chambers 25 defined between them with each chamber dimensioned so as to get progressively narrower in a circumferential direction, and compression coil springs 27 which resiliently urge the corresponding balls 26 toward the narrower parts of the chambers 25.

The pretensioner device P is normally attached to a side of a seat. Because this pretensioner device P is essentially symmetric with respect to a center line with respect to the thickness thereof, it may be attached to the seat either with one of the plates 12 facing the seat or with the other plate 13 facing the seat. Thus, the same pretensioner device P can be used commonly for the right and left front seats so that the management of the component parts can be simplified, and the assembly work for the pretensioner device P is also simplified.

Figure 6:
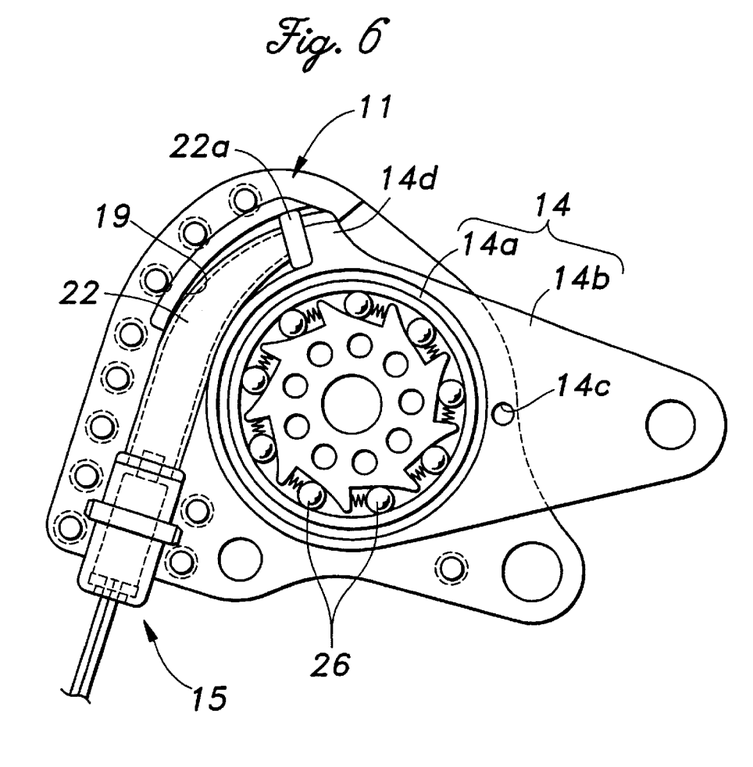
FIG. 6 is a view for showing the mode of operation of the seat belt pretensioner device according to the present invention.

Now the mode of operation of the illustrated embodiment is described in the following. Upon detection of an impact by a deceleration sensor (not shown in the drawings), the propellant 21 of the thrust generating device 15 is ignited. and the pressure of the resulting combustion gas expands the balloon packing 22 into the chamber 19. As the free end contact portion 22*a* thereof pushes the projection 14*d*, the pins 18*a*, 18*b* are broken so as to allow the arm 14 to rotate freely, and tile arm 14 is then turned in a clockwise direction in FIG. 2. The rotation of the arm 14 causes the buckle 8 to be pulled in (see FIG. 6), and the resulting increase in the tension of the seat belt increases the restraining capability thereof. At this time, because the reversal of the movement of the arm 14 is prevented by the reverse preventing device 16. the slackening of the seat belt can be avoided even after the pressure of the combustion gas has disappeared. The air in the chamber 19 is displaced out of the chamber 19 from an opening in the base unit 11 from which the other end 14*b* of the arm 14 projects.

Figure 7:
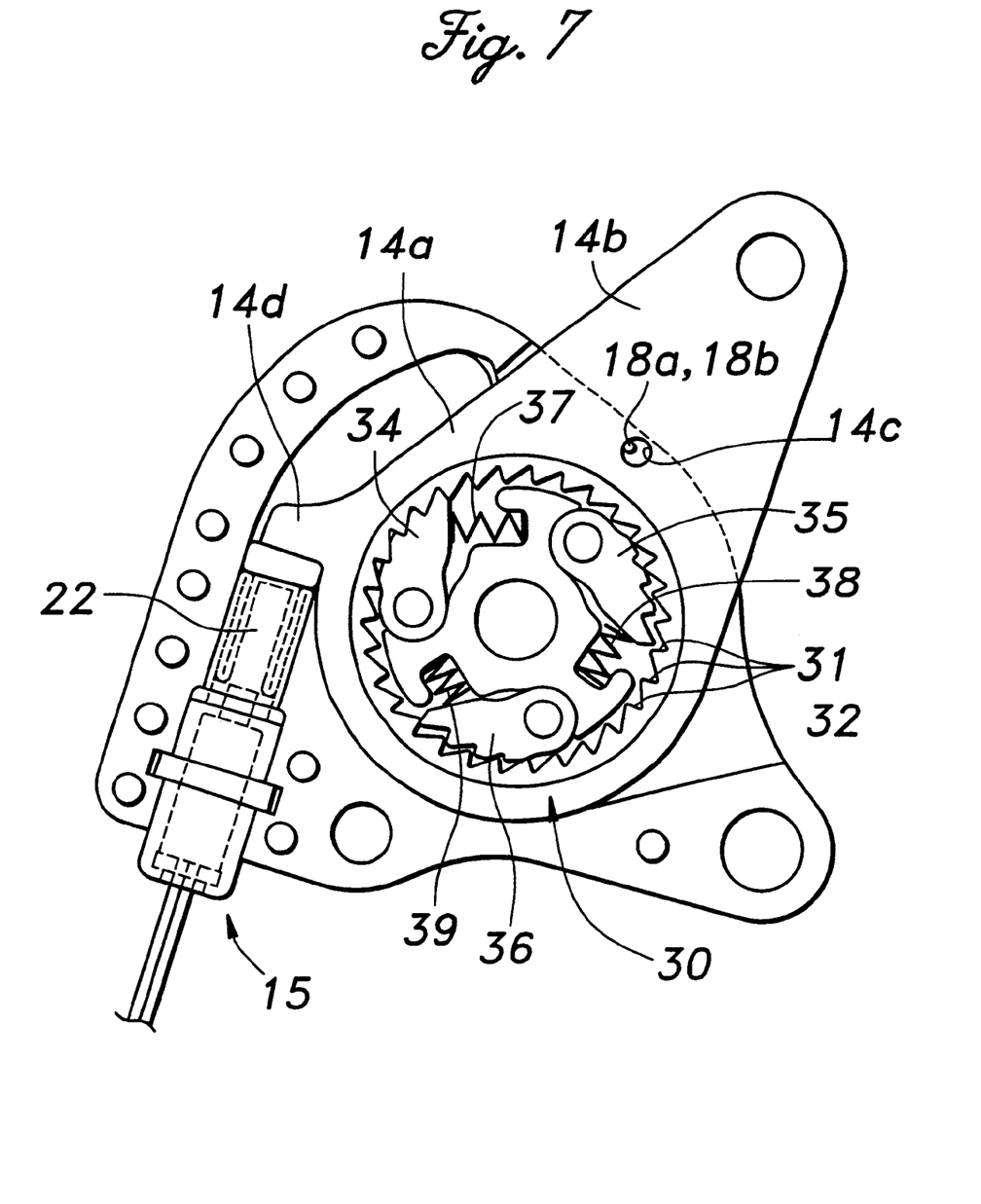
FIG. 7 is a view similar to FIG. 2 showing an alternate embodiment of the seat belt pretensioner device according to the present invention.

FIG. 7 is a view similar to FIG. 2 showing another embodiment of the seat belt pretensioner device embodying the present invention, and the parts corresponding to those in FIG. 2 are denoted with like numerals without repeating the description of such parts. In this embodiment, the reverse preventing device 30 for preventing the reversing of the movement of the arm 14 consists of a ratchet mechanism instead of the ball-type one-way clutch. This arrangement requires fewer component parts as compared with the arrangement using the ball-type one-way clutch.

The annular portion 14*a* of the arm 14 is formed with internal ratchet teeth 31, and a fixed inner member 32 which is integral with the base unit 11 and located inside the annular portion 14*a* is provided with a plurality (three, in the illustrated embodiment) of ratchet pawl members 34 to 36 each of which is pivotable between two positions for engaging and disengaging the ratchet teeth 31, respectively. The ratchet pawl members 34 to 36 are each resiliently urged into engagement with the ratchet teeth 31 by a corresponding compression coil spring 37 to 39.

In this embodiment, the ratchet teeth 31 are provided at the pitch of 12 degrees, and are 30 in total number. On the other hand, the ratchet pawl members 34 to 36 are arranged unevenly, instead of being arranged evenly at the pitch of 120 degrees, the pitch between the ratchet pawl members 34 and 35 and between the ratchet pawl members 35 and 36 being 124 degrees while the pitch between the ratchet pawl members 36 and 34 is 112 degrees. In other words, these ratchet pawl members 34 to 36 cannot simultaneously engage the ratchet teeth 31, and there is an offset of four degrees in the angular interval for the engagement of one pawl member to another. Therefore, the ratchet pawl members 34 to 36 engage the ratchet teeth 31 in turn as sequentially illustrated in FIGS. 8*a* to 8*c*, and the arm 14 can be engaged at the pitch of four degrees even though the pitch of the ratchet teeth 31 is 12 degrees without requiring any unduly high precision in the component pans. Thus, even though the ratchet teeth are not required to be formed at any fine pitch, a high resolution power can be achieved, and the backlash at the time of engagement can be minimized. Also, the mechanical strength of engagement can be increased, and the reliability of the locking action can be improved.

Figure 8A:
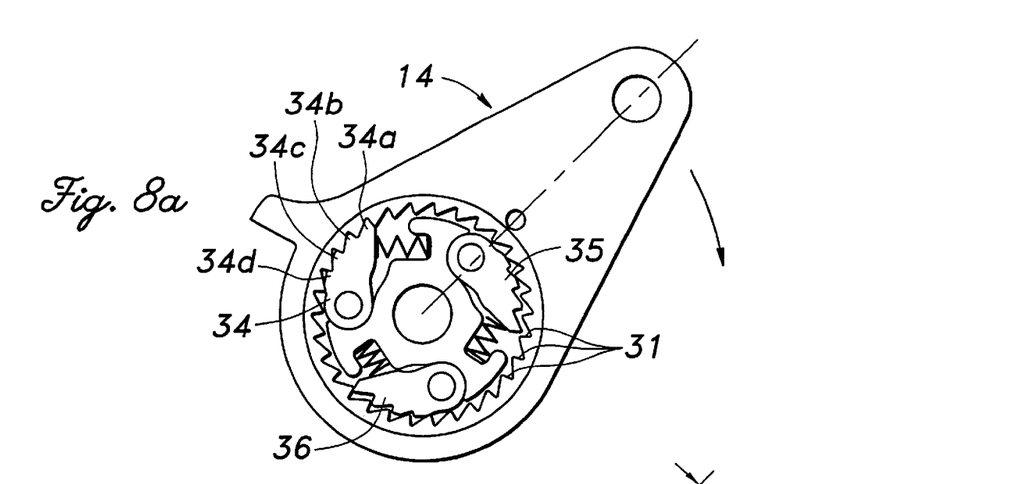
FIGS. 8a, 8b and 8c are views showing the mode of operation of the alternate embodiment of the seat belt pretensioner device according to the present invention.
Figure 8B:
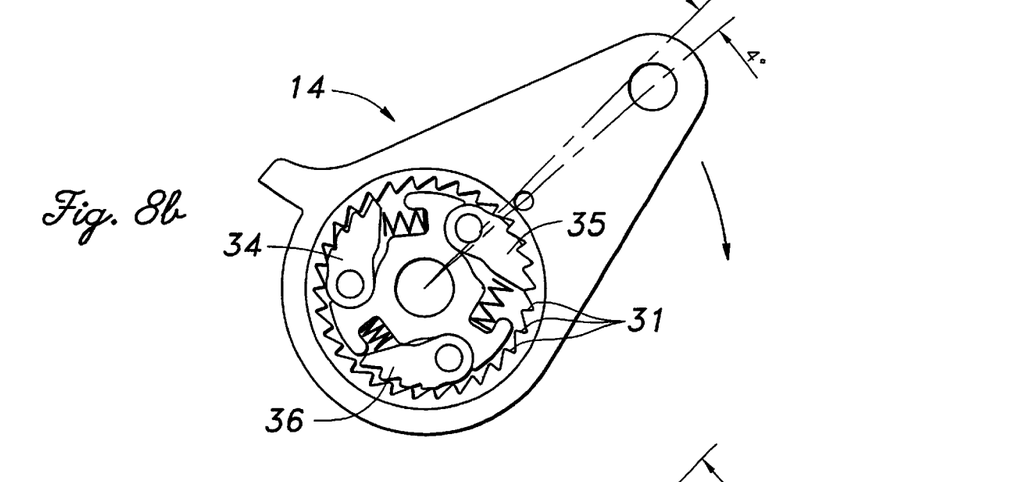
Figure 8C:
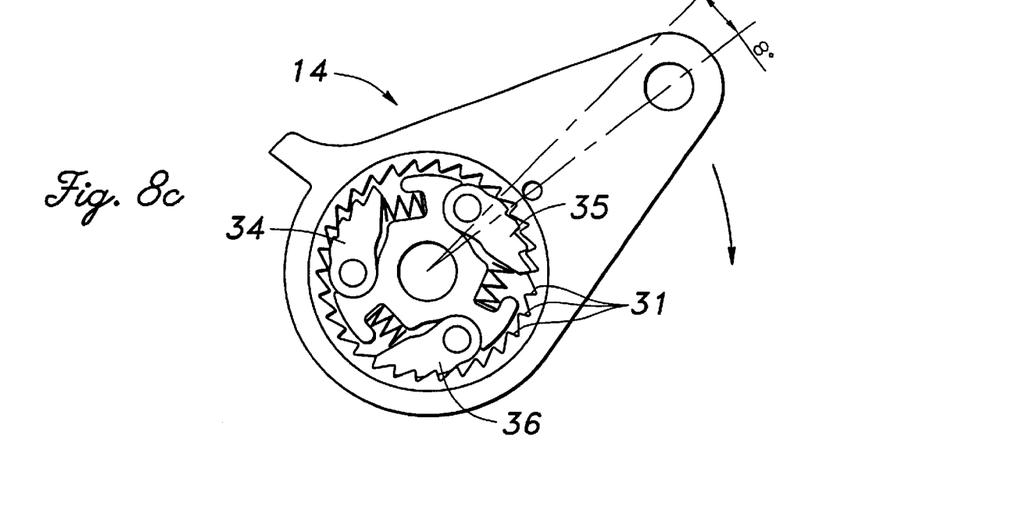

The mechanical strength of the locking action can also be increased by increasing the material strength of the gear teeth and the ratchet wheel through suitable heat treatment. According to the present invention, because the sizes of the ratchet teeth and pawl members can be increased for a given resolution power, it is possible to achieve the target mechanical strength without requiring any heat treatment Therefore, it is possible to design this arrangement in such a manner that one of the pawl members ensures the target mechanical strength, and when a load exceeding the target mechanical strength is applied to the device, the remaining two pawl members engage the ratchet teeth 31 in a sequential manner with the progress of deformation of the parts involved in the engagement between the ratchet teeth and the pawl member and/or the progress of deformation of the plates 12 and 13 and arm 14.

For instance, if four pawl members are provided at the intervals of 93 degrees, 93 degrees, 93 degrees and 81 degrees, the resolution power of three degrees can be achieved. If six pawl members are provided at the intervals of 62, 62, 62, 62, 62 and 50 degrees, the resolution power of two degrees can be achieved. In short, a desired resolution power can be achieved by proper selection of the pitch of the ratchet teeth and the number of pawl members. In the above described embodiments, the shape of the pawl members 34 to 36 was identical, and an offset was provided in the arrangement of the pawl members, but it is also possible to arrange the pawl members evenly while varying the length and/or shape of each pawl member so as to shift the timing of engagement of the pawl members.

Each of the pawl members 34 to 36 is provided with a plurality of pawls which are progressively smaller toward the pivot center. For instance, as shown in FIG. 8*a*, the pawl 34*a* most remote from the pivot center has the greatest length, and the pawl 34*d* most adjacent to the pivot center has the smallest length. Therefore, even though there is an offset between the pivot center of the pawl member and the center of the ratchet teeth 31, the pawls 34*a* to 34*d* can engage with and disengage from the ratchet teeth 31 substantially at the same time. Also, the locking mechanical strength can be increased over the case where the pawls 34*a* to 34*d* are all short. Also, the required stroke of the pawl member can be reduced as compared to the case where all the pawls are as long as the longest pawl 34*a* so that relatively small springs having a smaller spring constant can be used fox resiliently urging the pawl members toward the ratchet teeth at a target spring load. This contributes to the compact design of the device. The same is true with the remaining pawl members 35 and 36.

This embodiment is otherwise similar to the previous embodiment, and the mode of operation of this embodiment is omitted as it is similar to that of the previous embodiment.

Figure 9:
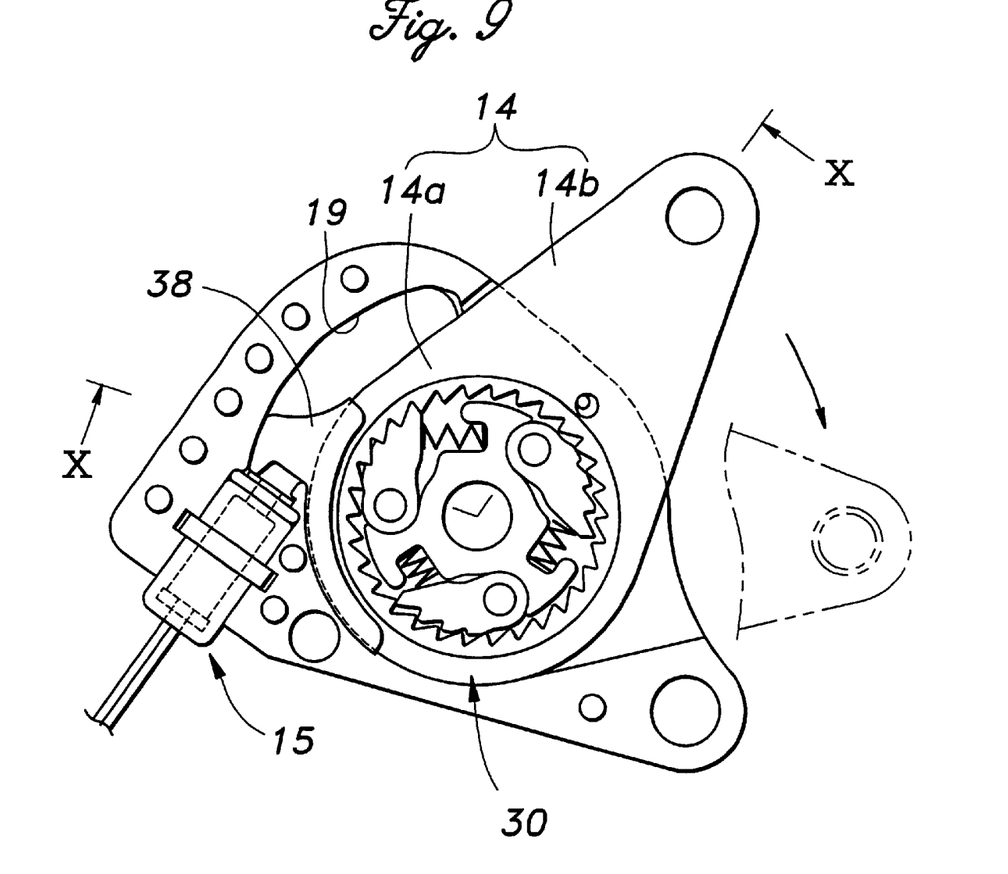
FIG. 9 is a view similar to FIG. 2 showing another alternate embodiment of the seat belt pretensioner device according to the present invention.
Figure 10:
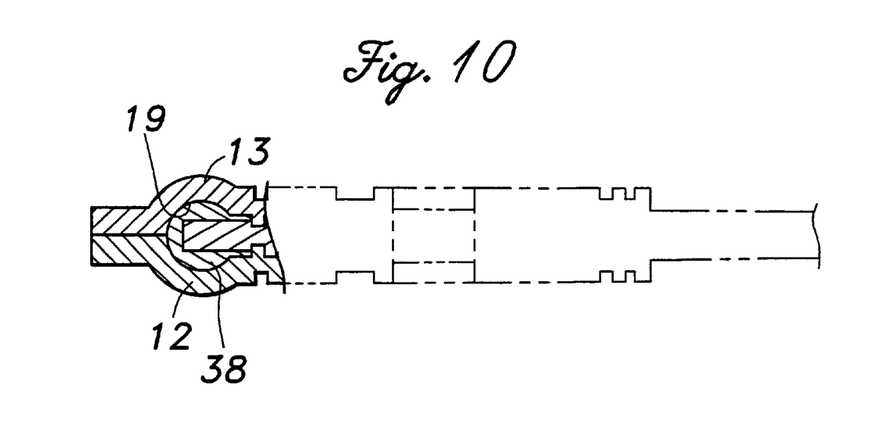
FIG. 10 is a sectional view taken along line X—X of FIG. 9.

FIG. 9 is a view similar to FIG. 7 showing yet another embodiment of the seat belt pretensioner device embodying the present invention, and the parts corresponding to those in FIG. 7 are denoted with like numerals without repeating the description of such parts. As shown in FIG. 10 also, in this embodiment, the arm 14 is integrally provided with a packing portion 40, either by integral forming or by assembling, for directly supporting the pressure of the combustion gas produced from the thrust generating device 15 in the chamber 19, instead of using a balloon packinting. This allows the number of component parts to be reduced, and simplifies the assembly work. An O-ring is provided between the cylinder 20 of the thrust generating device 15 and the base unit 11. This embodiment is otherwise similar to the previous embodiments, and the mode of operation is omitted because its mode to operation is not different from those of the previous embodiments. The chamber 19 and packing portion 40 were provided with circular cross sections in the above described embodiments, but the last embodiment permits the use of rectangular and semi-circular cross sections, and simplifies the machining work.

INDUSTRIAL APPLICABILITY

As can be appreciated from the above description, according to the pretensioner device of the present invention, because the combustion gas pressure obtained from the power generating device is, either directly or only via a bladder-like member, applied to a buckle supporting member to actuate the buckle, a link mechanism is not required, and the number of component parts can be minimized. This contributes to the compact and light-weight design of the overall device. The movement of the buckle is achieved only through a change in the inner pressure of the chamber of the bladder-like member from the start to the end of its motion, and there is no cause for attenuation in power transmission due to the changing of the direction of a force by a link mechanism or other mechanical structures so that the size of the power generator can be minimized.

Also, by forming the reverse preventing device with a plurality of ratchet teeth, and a plurality of pawl members which engage the ratchet teeth at different timing, the number of component parts is reduced even further, and a high resolution power can be achieved without unduly increasing the manufacturing precision as compared to the case where the ratchet teeth are formed at a finer pitch. Also, the backlash at the time of engagement can be minimized. Additionally, the mechanical strength of engagement is increased, and the locking reliability is improved.

What is claimed is:

1. A seat belt pretensioner device, comprising:
   a fixed base unit defining an arcuate elongated chamber centered around a pivot center;
   an arm rotatably supported by said fixed base unit so as to be rotatable around said pivot center, said arm including a free end attached to a seat belt buckle, and a projection slidably received in said elongated chamber;
   a power generator adapted to produce a pressure by means of a combustion of a propellant provided at an end of said elongated chamber; and
   a bladder provided at an end of said power generator from which a gas is produced, said bladder designed to receive and contain said gas therein upon activation of said power generator so that said arm may be turned in a direction to pull said seat belt buckle and increase tension in a seat belt.

2. A seat belt pretensioner device according to claim 1, wherein said bladder is provided with a contact portion having a high rigidity.

3. A seat belt pretensioner device according to claim 1, wherein said base unit comprises a pair of plate members jointly defining said arcuate elongated chamber and receiving part of said arm therebetween.

4. A seat belt pretension device according to claim 3, wherein said arm comprises an annular base end defining a central opening for receiving therein a reverse preventing mechanism for said arm.

5. A seat belt pretensioner device according to claim 4, wherein said reverse preventing mechanism comprises an inner race member fixedly and centrally attached to said fixed base unit, and a set of balls and springs interposed between an outer circumference of said inner race member and an inner circumference of said central opening of said arm.

6. A seat belt pretensioner device, comprising:
   a fixed base unit defining an arcuate elongated chamber centered around a pivot center;
   an arm rotatably supported by said fixed base unit so as to be rotatable around said pivot center, said arm including a free end attached to a seat belt buckle, and a projection slidably received in said elongated chamber;
   a power generator adapted to produce a pressure by means of a combustion of a propellant provided at an end of said elongated chamber; and
   a packing member attached to said arm to define, in cooperation with said elongated chamber of said fixed base unit and said projection of said arm, an enclosed chamber to receive and retain therein a gas produced from said power generator upon activation of said power generator so that said arm may be turned in a direction to pull said seat belt buckle and increase tension in a seat belt.

7. A seat belt pretensioner device according to claim 6, wherein said base unit comprises a pair of plate members jointly defining said arcuate elongated chamber and receiving part of said arm therebetween.

8. A seat belt pretensioner device according to claim 6, wherein said arm comprises an annular base end defining a central opening receiving therein a reverse preventing mechanism for said arm.

9. A seat belt pretensioner device according to claim 8, wherein said reverse preventing mechanism comprises an inner race member fixedly and centrally attached to said fixed base unit, a set of pawls pivotally supported by said inner race member, a set to springs urging said set of pawls in a prescribed direction, and a plurality of inner ratchet teeth formed on an inner periphery of said central opening for cooperation with said set of pawls.

* * * * *